US012402006B1

(12) United States Patent
Mukherjee et al.

(10) Patent No.: US 12,402,006 B1
(45) Date of Patent: Aug. 26, 2025

(54) SYSTEMS AND METHODS FOR IDENTIFYING TRANSMITTERS

(71) Applicants: Tathagata Mukherjee, Huntsville, AL (US); Eduardo Pasiliao, Fort Walton Beach, FL (US); Debashri Roy, Fort Walton Beach, FL (US); Mainak Chatterjee, Orlando, FL (US); Erik Blasch, Dayton, OH (US)

(72) Inventors: Tathagata Mukherjee, Huntsville, AL (US); Eduardo Pasiliao, Fort Walton Beach, FL (US); Debashri Roy, Fort Walton Beach, FL (US); Mainak Chatterjee, Orlando, FL (US); Erik Blasch, Dayton, OH (US)

(73) Assignees: Board of Trustees of The University of Alabama, for and on Behalf of The University of Alabama in Huntsville, Huntsville, AL (US); University of Central Florida, Orlando, FL (US)

( * ) Notice: Subject to any disclaimer, the term of this patent is extended or adjusted under 35 U.S.C. 154(b) by 1023 days.

(21) Appl. No.: 17/211,435

(22) Filed: Mar. 24, 2021

Related U.S. Application Data

(60) Provisional application No. 63/008,556, filed on Apr. 10, 2020, provisional application No. 62/993,751, filed on Mar. 24, 2020, provisional application No. 62/993,748, filed on Mar. 24, 2020.

(51) Int. Cl.

| | |
|---|---|
| ***H04L 9/32*** | (2006.01) |
| ***H04L 9/40*** | (2022.01) |
| ***H04W 12/122*** | (2021.01) |

(52) U.S. Cl.
CPC ....... *H04W 12/122* (2021.01); *H04L 63/1483* (2013.01)

(58) Field of Classification Search
CPC .......................... H04W 12/122; H04L 63/1483
USPC .......................................................... 713/176
See application file for complete search history.

(56) References Cited

U.S. PATENT DOCUMENTS

2015/0077129 A1* 3/2015 Zinevich .................. G01S 5/06 324/512
2020/0213354 A1* 7/2020 Chakraborty ......... G06F 9/4416
2020/0398083 A1* 12/2020 Adelsheim ............. G06N 3/045

* cited by examiner

*Primary Examiner* — Jeffrey C Pwu
*Assistant Examiner* — Samuel Ambaye
(74) *Attorney, Agent, or Firm* — Jon E. Holland; Butler Snow LLP

(57) ABSTRACT

A signal transmitted by a trusted transmitter is sampled, and a machine-learning algorithm is trained using these samples to learn to distinguish the signal characteristics of the trusted transmitter from the signal characteristics of other transmitters. The machine-learning parameters learned to distinguish the trusted transmitter's signals can then be exported allowing other devices to authenticate signals from the trusted transmitter. Since the signal characteristics of the trusted transmitter is based on manufacturing variations, the transmitters of unauthorized users should be unable to replicate the signal characteristics of the trusted transmitter. Thus, the transmitters of unauthorized users should not be usable to spoof a device that uses the exported parameters to authenticate messages from the trusted transmitter.

12 Claims, 9 Drawing Sheets

(a) Real Data (b) Generated Data, before training (c) Generated Data, mid-training (d) Real Data, additional sample (e) Generated Data, after full training

SYSTEMS AND METHODS FOR IDENTIFYING TRANSMITTERS

CROSS REFERENCE TO RELATED APPLICATIONS

This application claims priority to U.S. Provisional Application No. 62/993,748, entitled "Transmitter Identification Using Adversarial Networks and In-Phase and Quadrature (IQ) Data" and filed on Mar. 24, 2020, which is incorporated herein by reference. This application also claims priority to U.S. Provisional Application No. 62/993,751, entitled "Radio Frequency Adversarial Learning (RFAL) for RF Transmitter Identification and Classification" and filed on Mar. 24, 2020, which is incorporated herein by reference. This application further claims priority to U.S. Provisional Application No. 63/008,556, entitled "Systems and Methods for Identifying Transmitters" and filed on Apr. 10, 2020, which is incorporated herein by reference.

FEDERALLY SPONSORED RESEARCH OR DEVELOPMENT

This invention was made with Government support under contracts Air Force Research Laboratory Contract FA8651-16-2-0009. The Government has certain rights in the invention.

RELATED ART

Wireless communication has been a popular form of communication for many years. Indeed, wireless communication is often used to make financial and other types of transactions involving sensitive information, such as user names, passwords, account numbers, or other information that users wish to keep private.

An important aspect of such communication of sensitive information is authentication of received messages or, in other words, ensuring that received messages have originated from a trusted source. Typically, networks use media access control (MAC) addresses, international mobile equipment identity (IMEI) numbers, and other data in a received message to identify participants (e.g., transmitters) on such networks. Many of these devices and communication protocols are susceptible to a number of attacks and exploits including man-in-the-middle attacks that allow the theft of sensitive data or to insert command and instructions while impersonating another device. Using such exploits, information used to authenticate a source may be cloned, copied, or spoofed by other rogue transmitters for malicious or nefarious purposes. By using such information, malicious actors can use rogue transmitters to impersonate other transmitters allowing the malicious actors to defeat many security protocols and measures.

Various forms of encryption and other verification methods have been used in an attempt to overcome such problems, but they are susceptible to various forms of exploits and impersonation methods. In general, improved techniques for transmitter identification are generally desirable to make it more difficult for unauthorized users or hackers to impersonate a trusted transmitter or otherwise defeat security measures that rely on authentication of received messages.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for identifying transmitters based on signal characteristics. Manufacturing variations of transmitters cause detectible changes in signal characteristics of the transmitted signals. These manufacturing variations result in a signal pattern that is unique to each transmitter even for those manufactured at the same factory. In some embodiments, a signal by a trusted transmitter is sampled, and a machine-learning algorithm is trained using these samples to learn to distinguish the trusted transmitter's signal from the signals transmitted by other transmitters. In some embodiments, the training of the machine-learning algorithm is performed against signals from transmitters attempting to mimic the trusted transmitter's signals. The machine-learning parameters learned to distinguish the trusted transmitter's signals can then be exported allowing other devices to authenticate signals from the trusted transmitter. Since the transmitters of unauthorized users should be unable to replicate the signal characteristics of the trusted transmitter, such transmitters should not be usable to spoof a device that has access to the exported parameters and uses such parameters to authenticate messages from the trusted transmitter.

Figure 1:
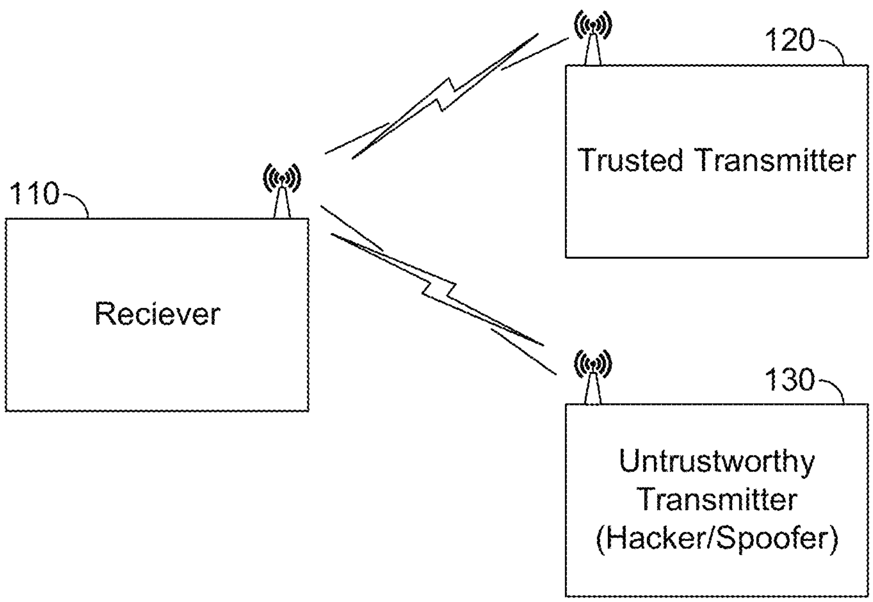
FIG. 1 is a block diagram illustrating an exemplary communication system having a receiver that receives communications from trustworthy and untrustworthy sources.

FIG. 1 is a block diagram illustrating an exemplary receiver 110 receiving communications from a trusted transmitter 120 and an untrustworthy transmitter 130. There are many scenarios involving wireless communications between devices (e.g., cellphones and cell phone towers, laptops and wireless routers/hot spots, key fobs and vehicles). While these systems often provide great benefits to their users, they expose users to many vulnerabilities by which malicious individuals (e.g., thieves, spies, hackers, etc.) can exploit these systems for nefarious purposes (e.g., steal data, intercept text messages, calls and other communications, unlock cars, start cars, or otherwise impersonate an authorized user). Many of these exploits involve using one transmitter 130 to impersonate a trusted transmitter 120. Such impersonations may include copying and retransmitting data from the trusted transmitter's signal, boosting signal of car key fobs and credit cards to facilitate unauthorized access and activity, man in the middle attacks, using authorization information of the trusted transmitter 120 (e.g., IMEI number, SIM number, cookie information, etc.), and so forth. This can also apply to military communication technologies. By providing a receiver the ability to distinguish one transmitter from another, greater security may be achieved and many of these exploits may be eliminated. For example, if an untrustworthy transmitter attempts to impersonate a trusted transmitter using the proper authentication information, successful impersonation should be preventable if the receiver can distinguish the transmitter based on the incoming signal characteristics. That is, since the characteristics of a transmitted signal are based on manufacturing variations, the untrustworthy transmitter should be unable to replicate the signal characteristics of the trusted transmitter.

Figure 2A:
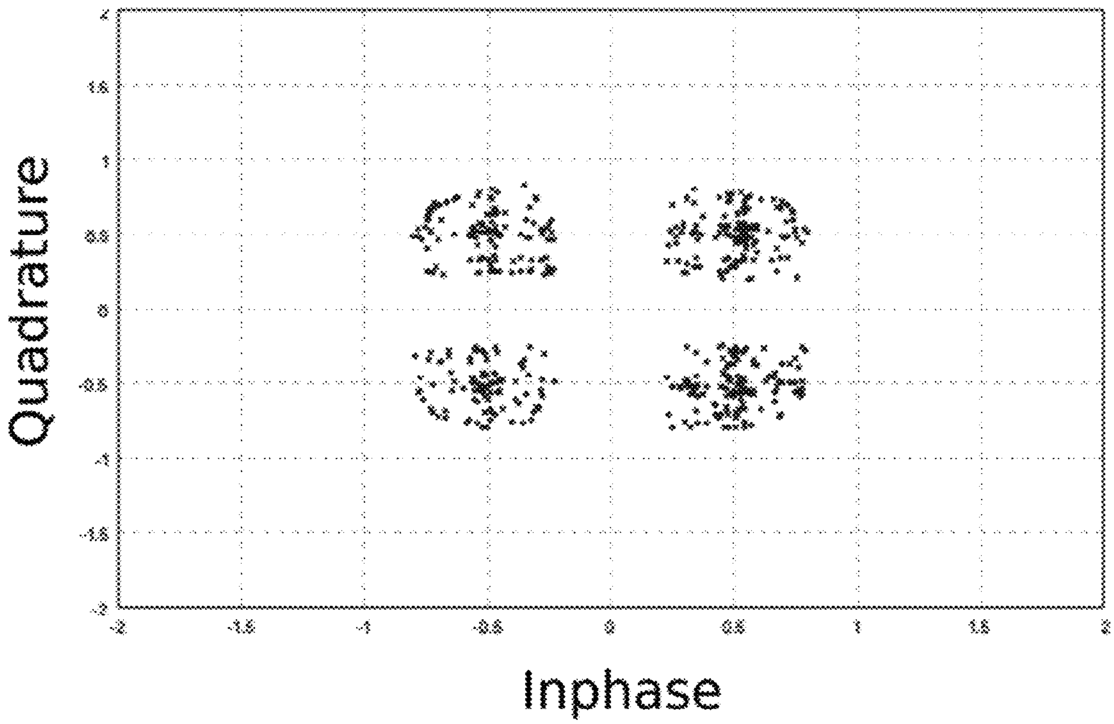
FIG. 2*a* is a graph illustrating exemplary plots of a quadrature component of a signal transmitted by a first transmitter versus an in-phase component of the signal.
Figure 2B:
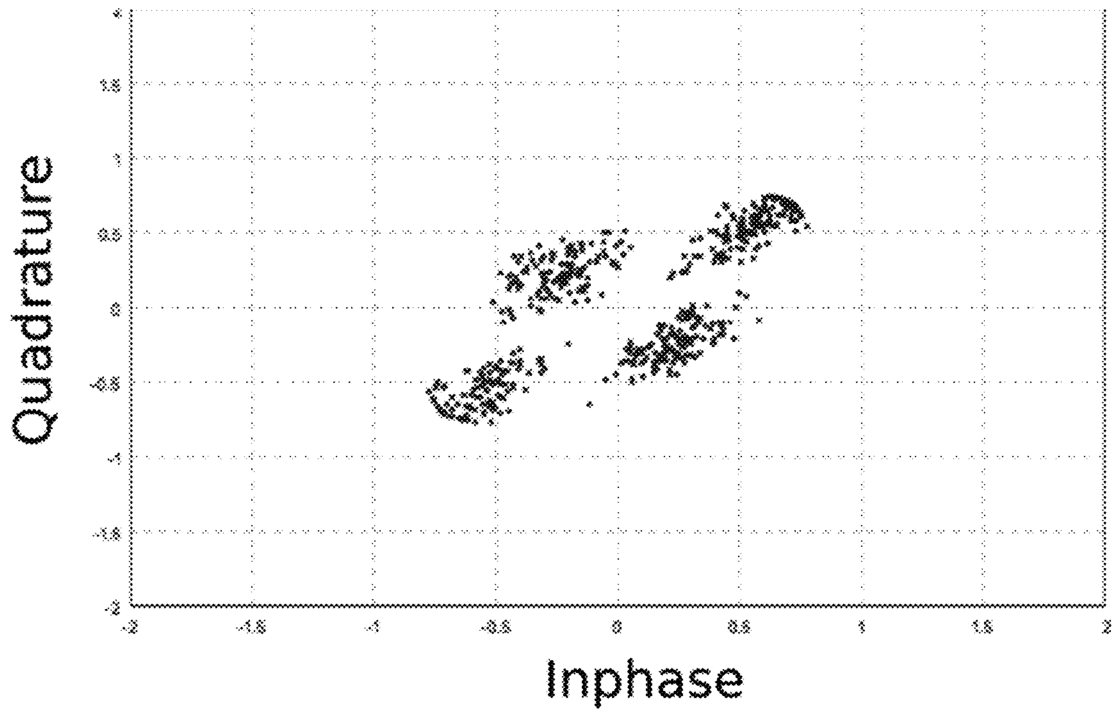
FIG. 2*b* is a graph illustrating exemplary plots of a quadrature component of a signal transmitted by a second transmitter versus an in-phase component of the signal.

There are many aspects of signal characteristics that may form the basis of signal identification and classification (e.g., transient analysis, bi-spectrum matrices, in-phase and quadrature (I/Q) imbalance analysis, etc.). For example, FIGS. 2*a* and 2*b* illustrate exemplary in-phase and quadrature differences between different transmitters. In FIG. 2*a*, a transmitter's broadcast may provide I/Q values that fall generally in four circular- or square-like arrangements. In FIG. 2*b*, a different transmitter while broadcasting similar or the same data has I/Q values that exhibit an angled compression. That is, the I/Q values of the transmitter for FIG. 2*a*, representing the signal pattern for a signal transmitted by such transmitter, form a signature that is unique or, in other words, different than the signature of I/Q values for the transmitter for FIG. 2*b*, representing the signal pattern for a signal transmitted by such transmitter. A system can be configured to identify such differences in a way to identify or distinguish between the sources of a signal by recognizing differences in signal characteristic patterns.

By training machine-learning algorithms on signal samples of a particular transmitter, referred to herein for illustrative purposes as the "trusted transmitter," compared to other signal samples from other transmitters, machine-learning algorithms may learn to distinguish the particular transmitter's signals from other signals. By introducing other signal samples, including signal samples that are very similar to the transmitter's signal samples, the machine-learning algorithms can learn to distinguish the characteristics of the trusted transmitter's signals from the characteristics of even very similar other signals. In some embodiments, the other signal sample set may include samples that are very close to the trusted transmitter's signal samples. In some embodiments, the other signals can be changed over time to be closer to the signal samples from the trusted transmitter, as will be discussed in more detail below. The process of training using similar samples is referred to "adversarial learning." The process of training using increasingly similar other samples generated with feedback from a discriminator is referred to as "generative adversarial learning."

Figure 3:
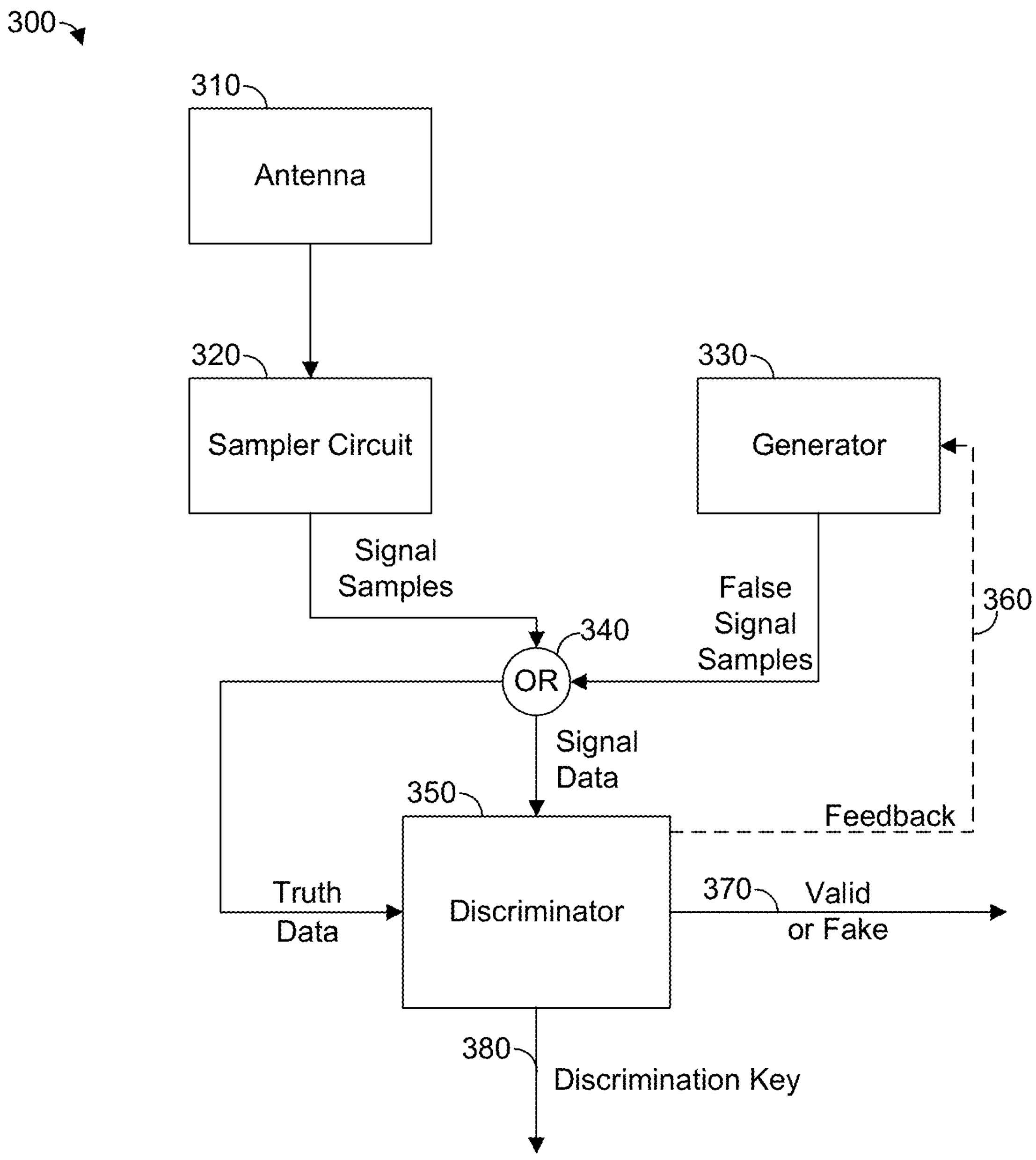
FIG. 3 is a block diagram illustrating an exemplary system for generating discrimination data.

FIG. 3 is a block diagram illustrating an exemplary embodiment of a discrimination key generator (DKG) 300. The DKG 300 receives a signal from a transmitter 110 through one or more antennas 310. The signal is sampled by a sampler circuit 320. In some embodiments, the sampler circuit 320 may include a digital radio or a software-defined radio (SDR). A generator 330 creates fake signal data to be used in training the discriminator 350. A sample selector 340 selects between signal samples 430 (FIG. 4) and fake signal samples 440 (FIG. 4) to send to the discriminator 350. The discriminator 350 implements a machine-learning algorithm that trains on the signals provided by the sample selector 340. The discriminator 350 also receives truth data from the sample selector 340 to update the discriminator's 350 learning functions. The discriminator 350 outputs a valid or fake determination 370. The discriminator 350 also creates a discrimination key 380 that may be used by other devices to perform the same determination calculated by the discriminator 350 without the need to sample the transmitter signal first or perform any training. In some embodiments, the discriminator 350 may provide feedback 360 to the generator 330 to improve the false signal sample generation to allow the generator 330 to produce fake signals 440 that are closer to the signal samples 430.

The machine-learning algorithm may include any known machine-learning methods including but not limited to regression, classification, clustering, dimensionality reduction, ensemble methods, neural nets and deep learning, transfer learning, reinforcement learning, etc. In a preferred embodiment, signal samples 430 (FIG. 4) include in-phase (I) and quadrature (Q) data and the discriminator 350 uses a form of recurrent neural network (RNN) to discriminate between real and fake transmitter signal samples. In some embodiments, the signal samples may be collected and transmitted via a network to a discriminator 350. Other machine learning techniques may be used. For example, in place of a RNN, a convolutional neural network (CNN) or a fully connected deep neural network (DNN) may be used.

Figure 4:
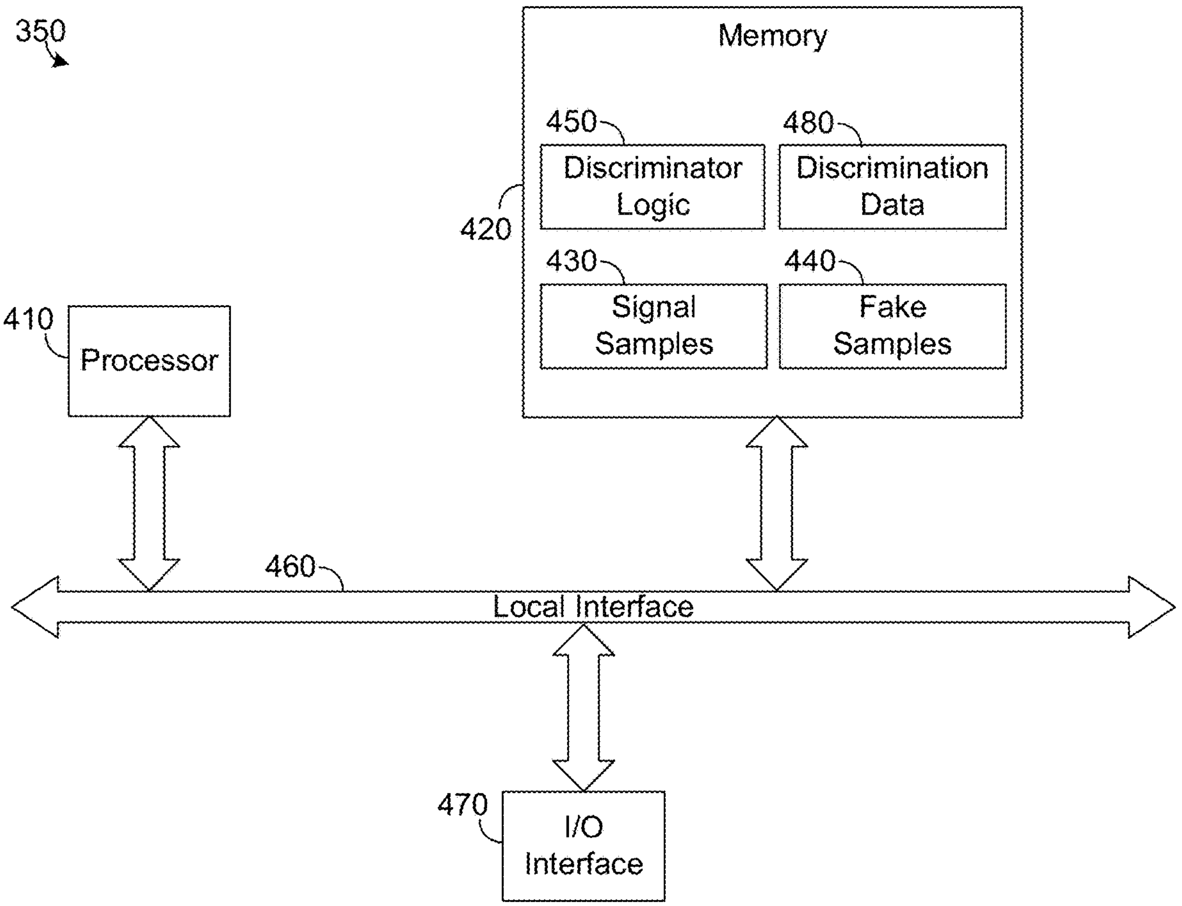
FIG. 4 is a block diagram illustrating an exemplary discriminator.

The discriminator 350 may be implemented in hardware (e.g., an application-specific integrated circuit (ASIC), a field programmable gate array (FPGA)), software and/or firmware in conjunction within one or more processors to execute the software and/or firmware, or any combination of hardware, software, or firmware. FIG. 4 illustrates an exemplary discriminator 350. The discriminator 350 may use one or more processors 410 (e.g., digital signal processor or central processing unit), a memory 420, and one or more input output (I/O) interfaces 470 connected through a local interface 460 (e.g., a system bus). The memory 420 may store discriminator logic 450 (including machine-learning functions) and discrimination data 480 (e.g., machine-learning variables, weights, or other parameters or data structures). The discrimination logic 450 may receive signal samples 430, fake samples 440, and truth data (distinguishing the signal samples 450 and the fake samples 440) to train the underlying machine-learning functions. Depending on the underlying machine-learning functions, the training may be iterative or performed all at once. Training of machine-learning functions often involve the setting and adjusting of collections of variables, weights, and other parameters and data structures collectively described here as discrimination data 480. As an example, as described in more detail herein, the discrimination data 480 may define the latent space representation learned by the discrimination logic 450 for encoding the variations in noise of the signal samples 430, noting that such variations are unique to the transmitter 110 being characterized. Thus, the discrimination data 480 represents the noise signature of such transmitter 110 and may be used by other receivers to identify the transmitter 110, as further described below.

After discriminator training has been completed, the discrimination data 480 may be output to allow other devices to distinguish between the signals from the transmitter 110 and other transmitters. Further details about discriminator training will be discussed later. A discrimination key 380 may refer to a serialization of discrimination data 480, a compression of the discrimination data 480, or an identifier allowing the query or lookup of the discrimination data 480 from a database or other storage location for the discrimination data 480.

A discriminator 350 may share hardware resources with other components of the DKG 300, including one or more processors 410 and memory 420. As an example, the generator 330 and/or sample selector 340 may utilize the same processors and/or memory as the discriminator 420. In some embodiments, the I/O interface 470 may be configured to receive signal samples 430, fake samples 440, and truth data for use by the discriminator logic 450.

In some embodiments, the inherent variation in signal generation due to manufacturing variations in transmitters is exploited to allow the identification or classification of the signal sources through analysis of the signals themselves. The DKG 300 receives a signal from a transmitter 120 (e.g., through an antenna 310). There may be decoders or demodulators to separate one signal from various other signals as known in the art. The signal is passed to a signal sampler 320 that creates signal samples 430 from the received signal. A generator 330 may be used to create fake signal samples 440. The signal samples 430 and fake signal samples 440 are fed into a discriminator 350. In some embodiments, the various samples are sent to the discriminator 350 in a random or iterative manner by a signal selector 340 in which case indicators (e.g., truth data) are also sent indicating whether each sample is an actual sample from the signal by the transmitter or a fake sample. The discriminator 350 uses a machine-learning algorithm to learn to distinguish between the signal samples 430 and fake signal samples 440. The machine-learning variables and parameters developed from such training are used to form the discrimination key 380.

In learning to identify unique or rare items among a large number of potentially similar and distinct objects, it may be helpful to begin by learning to distinguish between distinct objects first as a simpler case. To become an expert at distinguishing and identifying objects, it can be helpful to learn to distinguish between similar objects. Hence, in some embodiments, the generator 330 may use signal samples 430 or feedback from the discriminator 350 in generating fake signal samples 440. In some embodiments, during initial training, the fake signal samples 440 might not significantly resemble signal samples 430 during initial machine-learning training. As the discriminator 350 becomes better at distinguishing between signal samples 430 and fake signal samples 440, feedback from the discriminator 350 may be given to the generator 330 allowing the generator 330 to improve the quality of the fake signal samples 440 or, in other words, to make the fake signal samples 440 to more closely resemble the actual signal samples 430. Many different machine-learning techniques may be effectively used to perform the classification and identification of signals. Some experiments have shown that, among convolutional neural network (CNN), a fully connected deep neural network (DNN), and a recurrent neural network (RNN), a DNN appears more accurate than a CNN and a RNN is more accurate than a DNN. Experimental data indicates that a RNN with both long short-term memory (LSTM) and gated recurrent units (GRU) may be used to exploit the time series properties of the I/Q data for more consistent and accurate results. By taking into account the time series in the discriminator analysis, factors that change over time may be discovered by the machine-learning algorithms (e.g., transmitter parts properties change as they heat up changing differently due to slight manufacturing variations).

In some embodiments, the process of improving the fake signal samples 440 and improving the discriminator 330 may be repeated a set number of times, until a threshold quality is achieved, or some combination thereof. In some embodiments, the signal may be in the form of quadrature amplitude modulation (QAM), and signal samples 430 may be in the form of in-phase and quadrature data. In other embodiments, other types of signals and signal data may be used.

Figure 5:
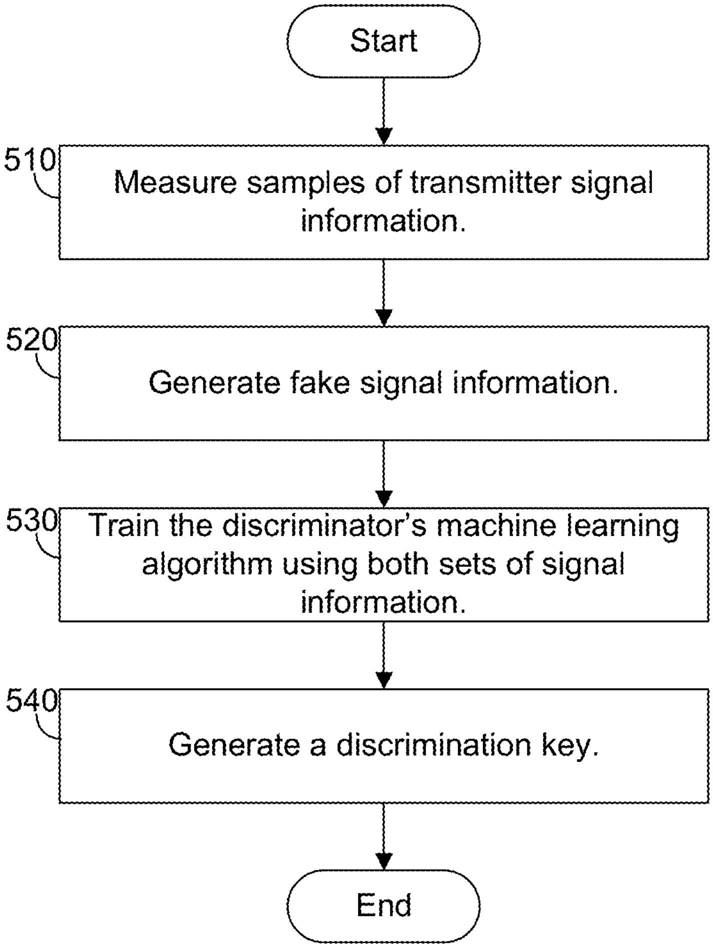
FIG. 5 is a flow chart illustrating an exemplary method of generating a discrimination key using machine learning.

FIG. 5 illustrates an exemplary embodiment of a process for generating a discrimination key using machine-learning. Initially, at step 510, the DKG 300, measures samples of the trusted transmitter's signal information. For example, a sampling circuit 320 attached to an antenna 310 can sample the trusted transmitter's signal. This sampling may take place, for example, by the transmitter's manufacturer or other user. At step 520, the generator 330 generates fake signal samples 440. The fake signal samples 440 can come in the form of purely computer-generated signals, collections of signals from other transmitters (e.g., recordings), or combinations thereof. At step 530, signal samples 430 and fake signal samples 440 are sent to the discriminator 350 to train the discriminator's machine-learning algorithm. The methods of training are described herein in more detail.

At step 540, a discrimination key 380 is generated for use in discriminating between signal samples 430 and fake signal samples 440. This discrimination key 380 can be stored for future use or transmitted to other devices, which may use the discrimination key 380 to authenticate signals, as will be described in more detail below.

Figure 6:
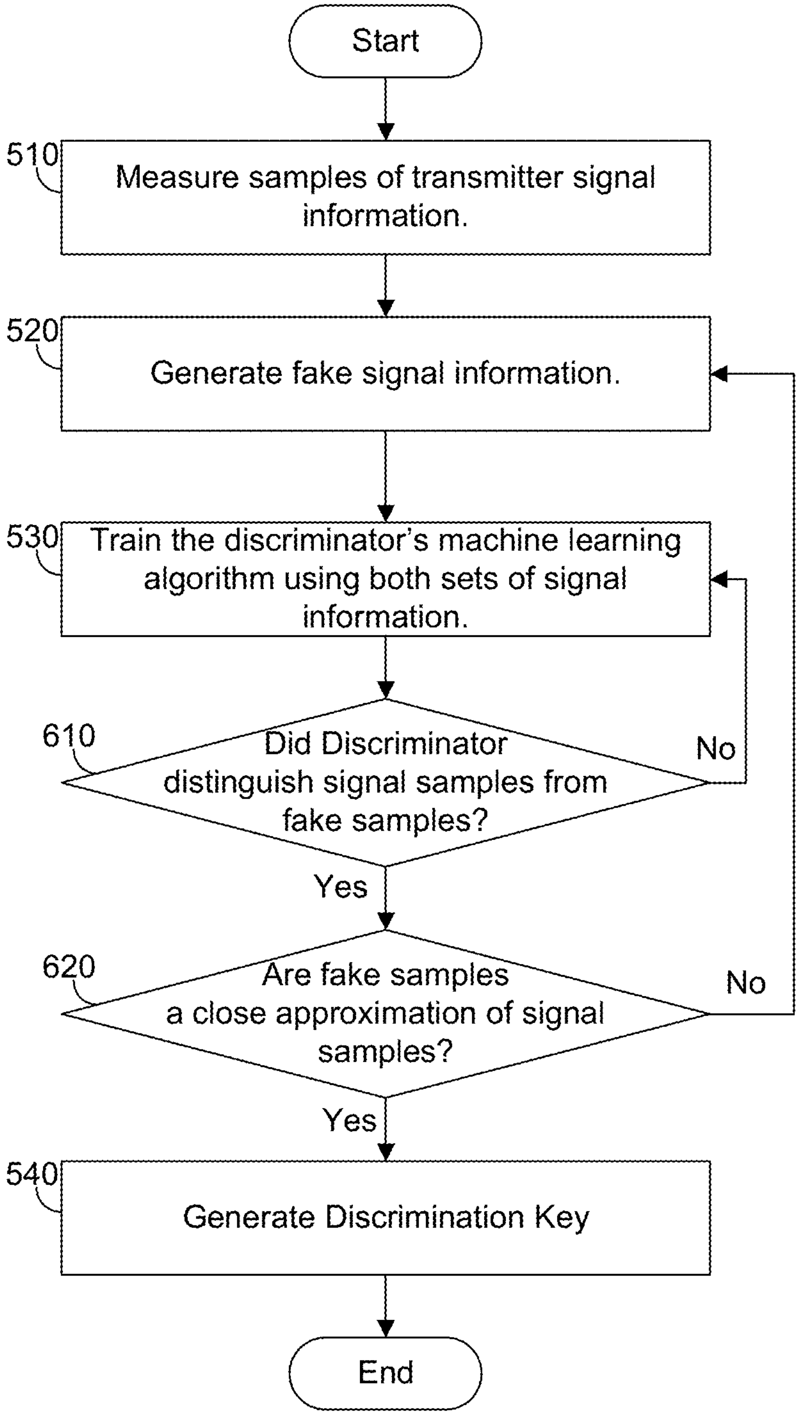
FIG. 6 is a block diagram illustrating an exemplary iterative method of generating a discrimination key using machine learning.

As discussed earlier, in some embodiments, the discriminator 350 may be trained by progressively better fake signal samples 440. Hence, in some embodiments, the discriminator 350 may be trained through an iterative method. The generator 330 may also receive feedback from the discriminator 350, access to the signal samples 430, or a combination thereof to improve the quality of the fake signals samples 440 (e.g., to make the fake signal samples 440 a closer approximation to the real signal samples 430), thereby improving the training of the discriminator 350. FIG. 6 is a block diagram illustrating an iterative method of generating a discrimination key 380 using machine-learning. Steps 510, 520, 530, and 540 are similar to what has been described previously. At step 610, the discriminator 350 can determine if the machine-learning functions have properly distinguished signal samples 430 from fake samples 440. In some embodiments, the discriminator 350 may use a threshold value to determine if the machine-learning functions are sufficiently accurate in distinguishing signal samples 430 from fake samples 440. If the discriminator 350 is able to distinguish signal samples 430 from fake samples 440 within the threshold accuracy, control passes to step 620, otherwise control passes to step 530 for further training.

At step 620, the discriminator 350 determines if the fake samples 440 are a close approximation of the signal samples 430. If so, control passes to step 540. Otherwise feedback from the discriminator 350 is returned to the generator 330, and control returns to step 530 to generate fake samples 440 that are closer approximations of the signal samples 430. The process of improving the fake signals and retraining the discriminator 350 may repeat successively until the fake samples 440 are determined to be within a threshold variation of the signal samples 430. In other embodiments, the process may repeat until the changes made to the fake samples 440 or discrimination machine-learning parameters falls below a predetermined threshold. In yet other embodiments, the process is repeated a specified number of times, or training of the discriminator steps 530 and 610 may be repeated until the accuracy achieved substantially stops improving.

Figure 7:
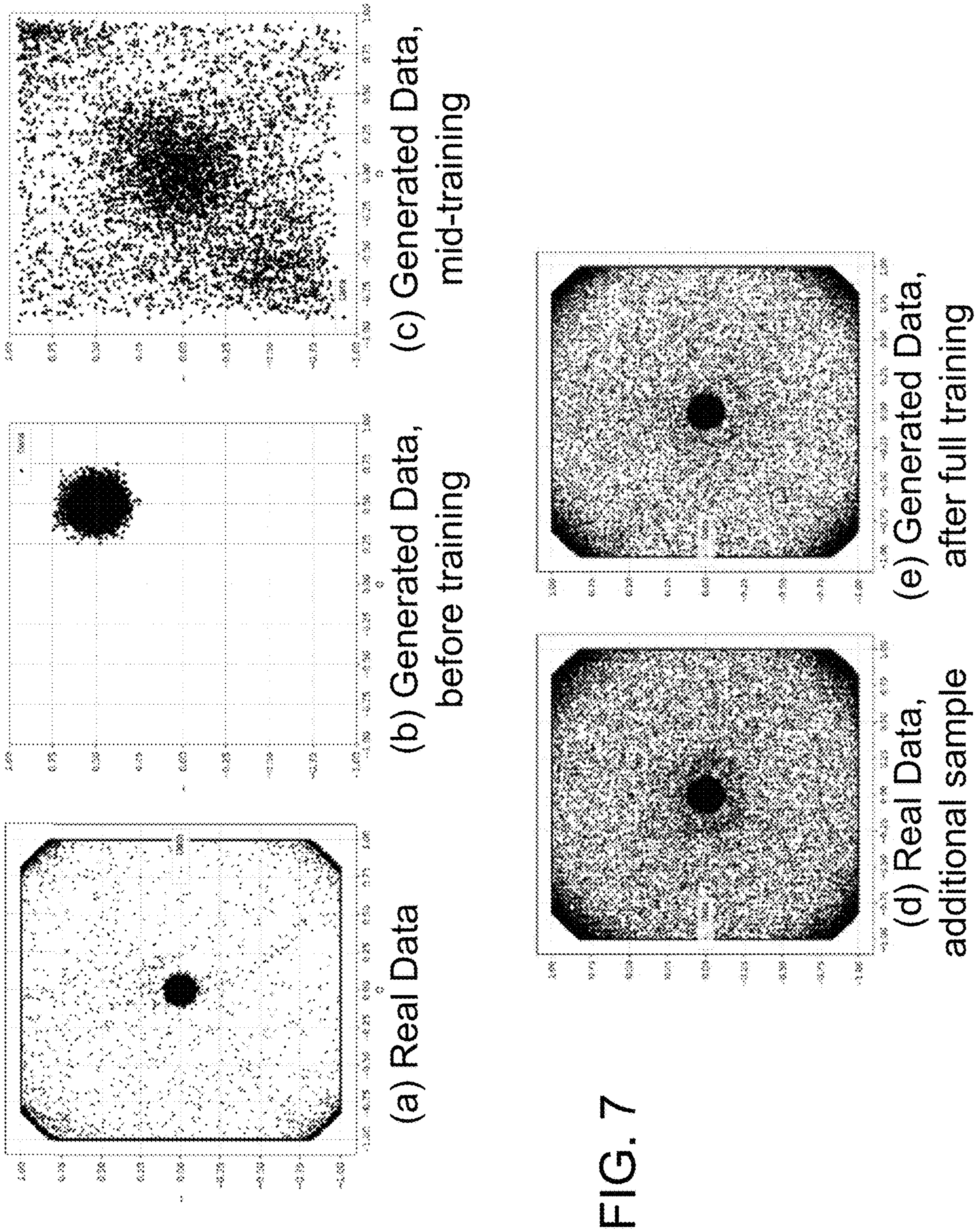
FIG. 7*a-e* illustrate the differences between real signal samples and generated signal samples as the generator is trained to better approximate signal samples.

To help illustrate how the fake signal samples may change, FIGS. 7*a-e* illustrate the differences between real signal samples 430 and fake samples 440 as the generator 330 is trained to better approximate signal samples 430. FIGS. 7*a* and 7*d* illustrate IQ data from signal samples 430 of an exemplary transmitter. FIGS. 7*b*, 7*c*, and 7*e* illustrate examples of fake samples 440 IQ data before training, after partially training, and after full training of the generator 330 respectively. Initially, the differences between the signal samples 430 (FIGS. 7*a* and 7*d*) and fake sample 440 (FIG. 7*b*) may be significant making distinguishing the signal sample 430 and fake sample 440 easy for the discriminator 350. As shown in FIGS. 7*c* and 7*e*, as the generator 330 becomes better trained, the differences between signal samples 430 (FIG. 7*d*) and fake samples 440 (FIG. 7*e*) becomes less apparent. A better trained generator 330 allows for the creation of better fake signal samples 440. By training on successively better data, the discriminator's machine-learning functions become significantly more adept on distinguishing signal samples 430 from the trusted transmitter than signals from other devices attempting to impersonate the trusted transmitter. Signal patterns that are too similar to be distinguished by humans can be distinguished by the machine-learning algorithms of the discriminator 350. Once the training has been completed, a discrimination key 380 may be generated at step 540.

After the discrimination key 380 is defined, the key 380 may be sent to other devices that can use the discrimination key 380 to authenticate signals from the trusted transceiver. That is, another device may use the key 380 to determine that a received signal was in fact transmitted by the trusted transmitter. In this regard, such other device may have an authenticator 850 (FIG. 8) that receives the discrimination key 380 and samples of a received signal. Based on the discrimination key 380, the authenticator 850 may analyze the samples to confirm whether they are consistent with the expected signal characteristics of a signal from the trusted transmitter. The authentication process may use similar or the same techniques described above for the DKG 300 to distinguish between samples of signals from the trusted transmitter and other types of samples. However, since the authenticator 350 has access to the discrimination key 380, it is unnecessary for the authenticator 850 to go through a training process as described above for the DKG 300. That is, the learned parameters from such training process at the DKG 300 may be included in the discrimination key 380 so that the authenticator 850 may use the same process to authenticate samples from the trusted transmitter without having to be trained.

Figure 8A:
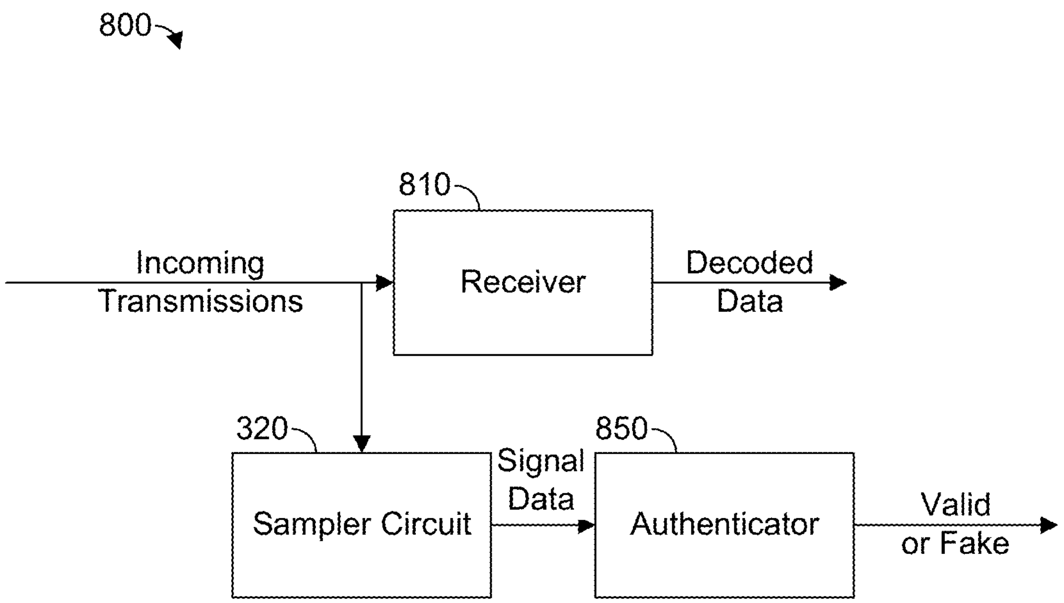
FIG. 8*a* is a block diagram illustrating an exemplary communication device configured to authenticate a signal from a trusted transmitter.

FIG. 8*a* is a block diagram illustrating an exemplary communication device 800 configured to authenticate a signal from a trusted transmitter. The device 800 has a receiver 810 that receives an incoming transmission (e.g., from an antenna). The receiver 810 decodes the incoming transmission to provide decoded data defining the information carried by the received signal. A sampler circuit 320 obtains a copy of the incoming transmission (e.g., either the same antenna for the receiver 810 or from another antenna). The sampler circuit 320 takes a sample of the incoming signal and sends the sample to the authenticator 850. The authenticator 850 uses the discrimination key to populate a discrimination algorithm with discrimination data 480 sufficient to determine if the signal data 430 is from the trusted transmitter 120 or another source. The authenticator 850 may then return an output indicative of whether the signal is from the trusted transmitter 120 or some other transmitter.

The authenticator 850 may have previously stored the discrimination key 380, may have received the discrimination key 380 as part of the transmission from the trusted transmitter, or may have received the discrimination key 380 by querying some other data source.

The discrimination algorithm of the authenticator 850 may be similar to that of the discriminator 350, except the authenticator 850 would not be required to use any of the learning functions for learning the discrimination data 480 or generate a discrimination key 380.

Figure 8B:
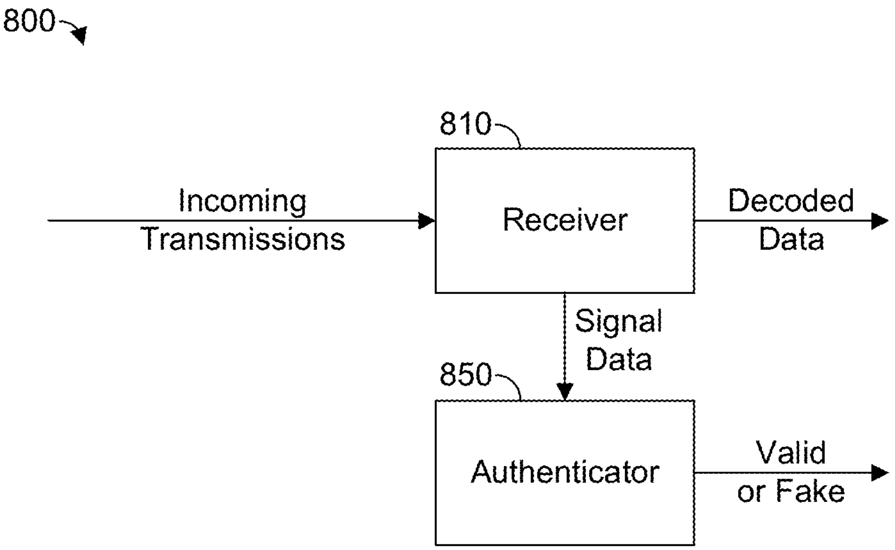
FIG. 8*b* is a block diagram illustrating an exemplary communication device configured to authenticate a signal from a trusted transmitter.

In some embodiments, a receiver 810 may be able to export signal data to the authenticator 850. For example, FIG. 8*b* illustrates another exemplary embodiment of the device 800 similar to that described in FIG. 8*a* except as indicated hereafter. In this embodiment, there is no separate sampler circuit 320. The receiver 810 extracts and provides a sample of the received signal to the authenticator 850. For example, receiver 810 may be a software-defined radio and have already decoded or have access to appropriate signal samples (e.g., IQ data) without using a separate sampler circuit 320.

In some embodiments, the authenticator 850 may share resources (e.g., one or more processors or memory) with the receiver 810 or other components of the device 800.

As noted above, the authenticator 850 is configured to set its authentication algorithm with the associated discrimination data 480 to enable the authenticator 850 to determine which signal samples are from the trusted transmitter. Upon receiving a sample of the signal received the receiver 810, the authenticator 850 determines if the signal sample is consistent with the learned characteristics of transmitter signals from the trusted transmitter. If so, the authenticator 850 returns to the receiver 810 or other component of the device 800 an indication that the received signal is from a trusted source. In such case, the data from the signal may be processed accordingly. Otherwise, the authenticator 850 provides an indication to the receiver 810 or other component of the device 800 that the received signal is not from a trusted source. In such case, the receiver 810 or other component may discard the signal or the data from the signal or perform other actions as may be desired.

Figure 9:
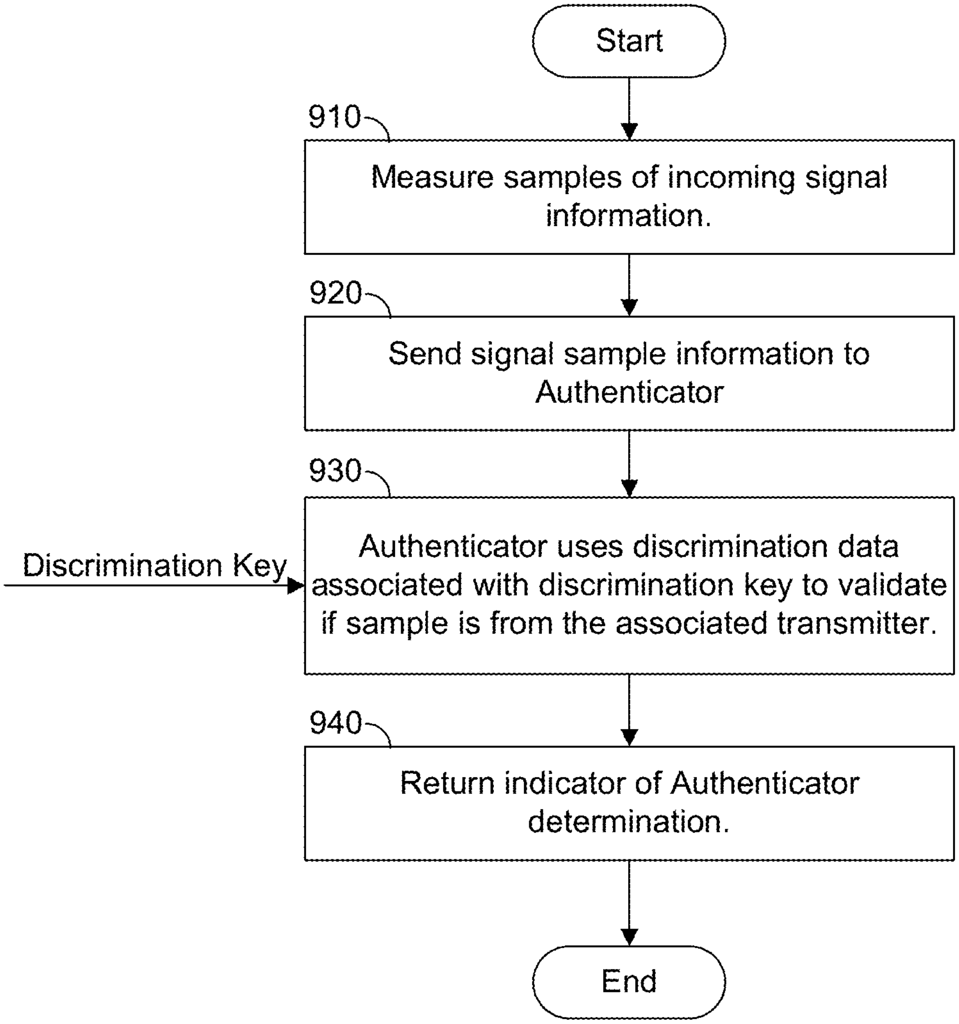
FIG. 9 is a block diagram illustrating an exemplary method of authenticating signals with a discriminator key.

FIG. 9 is a block diagram illustrating an exemplary method of authenticating signals using a discriminator key 380. At step 910, signal samples 430 are taken from an incoming signal. These signal samples may come from a separate sampler circuit 320 (as shown in FIG. 8*a*) or directly from the receiver 810 (as shown in FIG. 8*b*). At step 920, the signal samples are sent to the authenticator 850. This information can be sent via a serial bus, memory allocation, via an I/O interface, or over a network (e.g., after being captured by methods described in FIGS. 8*a* and 8*b*). At step 930, the authenticator 850 uses discrimination data 480 associated with the discrimination key 380 to validate if the signal samples are from a trusted source (e.g., a transmitter used to generate the discrimination key 380). At step 940, the authenticator 850 returns an indicator of the result of the authentication.

The signal data discussed above may take many different forms including analog and digital signals that may be represented in different ways known in the art. In some embodiments, the signal data includes IQ data. In some embodiments, the signal data includes timing data and IQ data. Timing data may come in many forms including timestamps, order or sequencing indicators, time order arrangement of data, and so forth. As an example, each data point may be defined by an I value (indicative of an in-phase component of the signal) and a Q value (indicative of the corresponding quadrature component of the signal), as described above, along with a timestamp indicating a time of the sample from which the associated I value and Q value were derived. Note that the samples used by the discriminator 350 and the samples used by the authenticator 850 may both include timing data, as described above.

Notably, the signal characteristics of a signal transmitted by the trusted transmitter may slightly change over time, such as due to temperature fluctuations in the transmitter. By treating the sample data as time series data indicative of sampling time, patterns in the changes to the sample data due to temperature fluctuations or other runtime conditions become recognizable and may assist to improve the accuracy at which the discrimination key 380 may be used to authenticate a signal from a trusted source.

In experiments, the generative and discriminative models were trained and tested on the collected sample datasets that had 1024 complex I/Q values per timestamp, generating 2048 features. This size offered excellent identification effectiveness. Larger sample sizes do offer greater accuracy but beyond a sample size of 1024 complex values seemed to be a point to diminishing returns. In such embodiments, the unique pattern of variation of the I/Q imbalances for each radio is captured by the machine-learning algorithm and discrimination data 480 as described earlier.

The signal information can be used to train machine-learning systems such as convolutional neural network (CNN), a fully connected deep neural network (DNN), and a recurrent neural network (RNN). Classification may be performed independent of identification, be performed prior to identification, or be performed subsequent to identification as described above. Initial experimental results reveal that the CNN, DNN, and RNN are able to correctly distinguish between the 8 trusted transmitters from the same manufacture with about 81.6%, 94.6% and 97% accuracy respectively. Better accuracy occurs when comparing transmitter's different manufacturers). Time ordered information can be entered in various ways including but not limited to passing previous results or inputs back into future inputs, use of ordered histories, use of carry over data, and so forth.

Some exemplary machine-learning parameters used during testing and these parameters may be set forth as follows for different implementations as exemplary embodiments. These parameters represent a trade of the best possible accuracy under the constraints of the training time include the following. During each training, the maximum epoch was set to 50 with an early stopping condition, such as, if there is no improvement of validation loss for five consecutive epochs, then the training is stopped. The observed results were achieved through multiple runs of training, indicated that each of the models converged within a given range of the maximum number of epochs. The CNN architecture converged between approximately 45-50 epochs, with seven layers, a learning rate of 104. The DNN architecture converged between approximately 35-40 epochs, with five layers, a learning rate of 10-3. The DNN architecture converged between approximately 35-40 epochs, with five layers, a learning rate of 10-3. The RNN-LSTM architecture converged between approximately 30-35 epochs, with six layers, a learning rate of 103. The RNN-GRU architecture converged between approximately 30-35 epochs, with six layers, a learning rate of 10-3. Each of the above architectures used a batch size of 128 entries. The listed epoch convergence may be used in some embodiments as train count, meaning training simply is performed the specified number of times or as maximum training count for the given architecture. In some embodiments, additional or fewer epochs may be added to the training counts.

The principles outlined herein can be put together in other ways to preform additional functions. For example, a series of signal samples from a collection of different trusted transmitters can be used to train a discriminator 350. The discriminator 350 may use machine-learning techniques common in machine classification techniques such as those described above to distinguish samples of signals transmitted by trusted transmitters from fake samples based on the same types of signal information described above. Such classification could be used to identify a transmitter as one among a set of trusted transmitters. In some embodiments, such classifications of a set of signal samples a group of trusted transmitters may offer diminished identification accuracy. The issue of diminished accuracy may be resolved by using results of the classification determination to select an associated discrimination key 380 based on the classification results. The selected discrimination key 380 may then be used to authenticate the signal sample's source.

In any event, for some embodiments, rather than training a discriminator 350 to learn the signal characteristics of a signal from a single trusted transmitter, the discriminator 350 may be trained to learn the signal characteristics of a group of trusted transmitters. The same techniques described above may be used for such training except that the discriminator 350 receives actual samples from each transmitter of a group of trusted transmitters rather than a single trusted transmitter. That is, each actual sample from a trusted transmitter of the group of trusted transmitters may be treated as a "good" or trusted sample (i.e., not a fake sample). Thus, if a communication device receives a signal from any of the trusted transmitters, the device's authenticator 850 should authenticate the signal from a trusted source using the same techniques described above.

In some embodiments, a trusted and untrusted classification may be performed first, followed by an identification classification, and then followed an authentication based upon the identification classification.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. For instance, the order of particular steps or the form of particular processes can be changed in some cases to perform equivalent steps. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A system for generating discrimination data that is based on hardware characteristics of a transmitter for use in authenticating the transmitter, comprising:

a sampling circuit configured to sample a signal transmitted by the transmitter, thereby defining a plurality of signal samples of the signal, wherein the signal transmitted by the transmitter is modulated with quadrature amplitude modulation (QAM), and wherein each of the plurality of signal samples of the signal comprises a measurement of an in-phase component (I) of the signal and a measurement of a quadrature component of the signal;

a generator configured to provide a plurality of false signal samples; and a discriminator configured to receive the plurality of signal samples of the signal and the plurality of false signal samples, the discriminator having at least one processor programmed with instructions that, when executed by the at least one processor, cause the discriminator to implement a machine-learning algorithm for learning to discriminate between the plurality of signal samples of the signal and the plurality of false signal samples based on a signal pattern unique to the transmitter represented by in-phase components and quadrature components of signals transmitted by the transmitter, wherein the discriminator is configured to generate the discrimination data for use in authenticating the transmitter based on truth data indicating whether decisions by the discriminator in discriminating between the plurality of signal samples of the signal and the plurality of false signal samples are correct.

2. The system of claim 1, wherein the generator is configured to receive the plurality of signal samples of the signal and to generate the plurality of false signal samples based on the plurality of signal samples of the signal.

3. The system of claim 1, wherein each of the plurality of signal samples of the signal comprises a timestamp.

4. A system for generating discrimination data that is based on hardware characteristics of a transmitter for use in authenticating the transmitter, comprising:

a sampling circuit configured to sample a signal transmitted by the transmitter, thereby defining a first plurality of signal samples of the signal, wherein the signal transmitted by the transmitter is modulated with quadrature amplitude modulation (QAM), and wherein each of the plurality of signal samples of the signal comprises a measurement of an in-phase component (I) of the signal and a measurement of a quadrature component of the signal;

a generator configured to provide a second plurality of signal samples; and a discriminator configured to receive the first plurality of signal samples and the second plurality of signal samples, the discriminator having at least one processor programmed with instructions that, when executed by the at least one processor, cause the discriminator to implement a machine-learning algorithm for learning to discriminate between the first plurality of signal samples of the signal and the second plurality of signal samples based on a signal pattern unique to the transmitter represented by in-phase components and quadrature components of signals transmitted by the transmitter, wherein the discriminator is configured to generate the discrimination data for use in authenticating the transmitter based on data used in the machine-learning algorithm for discriminating between the first plurality of signal samples and the second plurality of signal samples.

5. The system of claim 4, wherein the generator is configured to generate the second plurality of signal samples, wherein the discriminator is configured to provide feedback to the generator, and wherein at least one of the second plurality of signal samples is based on the feedback from the discriminator.

6. The system of claim 4, further comprising a communication device configured to receive a signal, the communication device having an authenticator configured to receive the discrimination data and a third plurality of signal samples from the received signal, the authenticator configured to analyze the third plurality of signal samples based on the discriminator data for authenticating the received signal.

7. The system of claim 4, wherein the discrimination data further comprises an encoding of the parameters for distinguishing between signals from the transmitter and other signals.

8. The system of claim 4, wherein the generator is configured to receive the first plurality of signal samples and to generate at least one of the second plurality of signal samples based on the first plurality of signal samples.

9. The system of claim 4, wherein each of the first plurality of signal samples comprises a timestamp.

10. A method for generating discrimination data that is based on hardware characteristics of a transmitter for use in authenticating the transmitter, comprising:

sampling a signal transmitted by the transmitter, thereby defining a plurality of signal samples of the signal, wherein the signal transmitted by the transmitter is modulated with quadrature amplitude modulation (QAM), and wherein each of the plurality of signal samples of the signal comprises a measurement of an in-phase component (I) of the signal and a measurement of a quadrature component of the signal;

receiving a plurality of false signal samples;

receiving truth data;

discriminating between the plurality of signal samples of the signal and the false signal samples based on a signal pattern unique to the transmitter represented by in-phase components and quadrature components of signals transmitted by the transmitter;

determining whether decisions in the discriminating are correct based on the truth data; and generating the discrimination data for use in authenticating the transmitter based on the determining.

11. The method of claim 10, further comprising generating the plurality of false signal samples based on the plurality of signal samples of the signal.

12. The method of claim 10, wherein each of the plurality of signal samples of the signal comprises a timestamp.

* * * * *